(12) United States Patent
Finger-Albert

(10) Patent No.: US 11,355,986 B2
(45) Date of Patent: Jun. 7, 2022

(54) ROTOR WITH A WINDING FOR AN ELECTRICAL MACHINE

(71) Applicant: Valeo Siemens eAutomotive Germany GmbH, Erlangen (DE)

(72) Inventor: Christian Finger-Albert, Bad Kissingen (DE)

(73) Assignee: VALEO SIEMENS EAUTOMOTIVE GERMANY GMBH, Erlangen (DE)

(*) Notice: Subject to any disclaimer, the term of this patent is extended or adjusted under 35 U.S.C. 154(b) by 141 days.

(21) Appl. No.: 16/699,348

(22) Filed: Nov. 29, 2019

(65) Prior Publication Data

US 2020/0177046 A1    Jun. 4, 2020

(30) Foreign Application Priority Data

Nov. 30, 2018  (DE) .......................... 102018130475.7

(51) Int. Cl.

| H02K 3/48 | (2006.01) |
|---|---|
| H02K 3/51 | (2006.01) |
| B60K 6/26 | (2007.10) |
| H02K 1/26 | (2006.01) |
| H02K 3/28 | (2006.01) |
| H02K 3/12 | (2006.01) |

(52) U.S. Cl.
CPC .................. *H02K 3/51* (2013.01); *B60K 6/26* (2013.01); *H02K 1/265* (2013.01); *H02K 3/12* (2013.01); *H02K 3/28* (2013.01); *H02K 3/48* (2013.01)

(58) Field of Classification Search
CPC .......... H02K 15/00; H02K 15/12; H02K 3/34; H02K 3/46; H02K 3/48; H02K 3/487; H02K 3/52; H02K 3/527
See application file for complete search history.

(56) References Cited

U.S. PATENT DOCUMENTS

| 5,892,306 | A  | * | 4/1999  | Lloyd   | H02K 15/165 |
|---|---|---|---|---|---|
|  |  |  |  |  | 310/51 |
| 7,239,060 | B2 | * | 7/2007  | Cros    | H02K 23/30 |
|  |  |  |  |  | 310/198 |
| 2004/0263019 | A1 | * | 12/2004 | Buchan  | H02K 3/527 |
|  |  |  |  |  | 310/214 |
| 2010/0259136 | A1 | * | 10/2010 | Hiramoto | H02K 19/12 |
|  |  |  |  |  | 310/68 D |
| 2011/0025160 | A1 | * | 2/2011  | Stancu  | G06T 11/40 |
|  |  |  |  |  | 310/180 |
| 2014/0077654 | A1 | * | 3/2014  | Kim     | H02K 21/042 |
|  |  |  |  |  | 310/181 |

(Continued)

FOREIGN PATENT DOCUMENTS

| DE | 60106334 T2 | 11/2005 |
|---|---|---|
| EP | 2807728 B1  | 9/2016  |

(Continued)

*Primary Examiner* — Tran N Nguyen
(74) *Attorney, Agent, or Firm* — Perry + Currier Inc.

(57) ABSTRACT

A rotor for an electrical machine, comprising:
  a rotor stack with a plurality of pole teeth and windings around the pole teeth,
  a plurality of groove wedges, which are arranged radially above the windings, in grooves between the pole teeth, characterised in that
a support element is arranged in the grooves between the windings and radially between the groove wedges and the rotor stack.

10 Claims, 4 Drawing Sheets

(56) References Cited

U.S. PATENT DOCUMENTS

| | | | |
|---|---|---|---|
| 2015/0076935 A1* | 3/2015 | Bulatow | H02K 15/12 |
| | | | 310/45 |
| 2015/0155753 A1* | 6/2015 | Kubo | H02K 3/487 |
| | | | 310/214 |
| 2015/0194855 A1 | 7/2015 | Kubo et al. | |
| 2016/0072352 A1 | 3/2016 | Lee et al. | |
| 2017/0353092 A1* | 12/2017 | Park | H02K 3/487 |

FOREIGN PATENT DOCUMENTS

| | | |
|---|---|---|
| GB | 2282012 A | 3/1995 |
| WO | WO-2013110580 A1 | 8/2013 |

\* cited by examiner

ROTOR WITH A WINDING FOR AN ELECTRICAL MACHINE

The invention relates to a rotor with a winding for an electrical machine, in particular an electric motor, and a vehicle with an electrical machine, in particular an electric motor, with the rotor.

PRIOR ART

Electric motors are known in general and are being used increasingly to drive vehicles. An electric motor consists of a stator and a rotor.

The rotor is for example permanently excited, designed as a squirrel-cage rotor, or separately excited. In separately excited rotors the rotor (or the rotor coils) has to be supplied with current, which is achieved for example via slip rings.

Document DE 2 807 728 B1 discloses a rotor with pole teeth, around which the wires are wound, with these thus forming coils. Groove wedges are situated between the individual pole teeth and increase the strength of the rotor.

Problem and Solution

The object of the present invention is to provide a rotor that has improved properties.

This object is achieved by a device according to the main claim. Advantageous embodiments are the subject of the dependent claims.

In accordance with the invention a rotor for an electrical machine comprises a rotor stack having a plurality of pole teeth and windings around the pole teeth, and a plurality of groove wedges arranged radially above the windings, in grooves between the pole teeth, wherein a support element is arranged in the grooves between the windings and radially between the groove wedges and the rotor stack.

The support element supports the groove wedges on the rotor stack and thus increases the strength of the rotor. Furthermore, the support element prevents the pole teeth from being bent tangentially against one another by the operational forces, which would compromise the performance and service life of the rotor.

In addition, the support element may consist of electrically non-conductive material, thus increasing the insulation between the windings.

The support element may preferably have at least one recess for compensating for an unbalance of the rotor. A compensation of the unbalance of the rotor resulting from the manufacturing process leads to improved running properties of the rotor.

The balancing may be implemented by the drilling of holes (negative balancing) or by the filling of the holes already present (positive balancing).

Further preferably, the support element may have at least one tooth radially in the direction of the groove wedge, which tooth is operatively connected to the groove wedge.

The tooth may be compressed by the groove wedge, whereby the groove wedge is fixed within the groove.

In an advantageous embodiment of the invention the support element may have a clamping point radially in the direction of the rotor stack, which clamping point is operatively connected to the rotor stack.

By clamping the support element between the groove wedge and the rotor stack, the support element may be protected against falling out. For example, a fixing of the groove wedge in the groove in conjunction with the teeth may be further improved by the clamping. The support element may preferably have a recess (25) in the direction of the windings.

The recess follows the outer contour of the windings so as to ensure a distance between windings and support element. The support element may thus easily be inserted axially into the groove once the coils have been wound, without damaging the windings.

In one embodiment of the invention the support element may have at least one recess in the radial direction in order to save weight, The recesses at these points may reduce the weight of the rotor without negatively influencing the stability of the rotor.

In a further embodiment of the invention the pole tooth may have an end portion which protrudes beyond the windings in the direction of the support element and has a holding region which is engaged with the groove wedge.

The holding region may hold the groove wedge autonomously and thus facilitate the assembly of the support element. It may also assist the clamping of the support element between groove wedge and rotor stack.

The support element may preferably support the groove wedge. In the event of rotation of the rotor, the pole teeth may be bent tangentially by the operational forces, and therefore the groove wedge could fall out. This is prevented by the support element.

Further preferably, the at least one tooth may extend merely over a region of the support element.

A partial extent of the tooth over the surface of the support element is sufficient for the necessary fixing of the groove wedge. For example, the teeth may be situated only at the start and at the end of the support element. In addition to a material saving, a weight saving is also made by the forming of the teeth only in some regions.

In accordance with the invention a vehicle comprises an electrical machine, in particular an electric motor, with a rotor according to one of the preferred embodiments.

DESCRIPTION OF THE DRAWINGS

FIG. 1 shows a rotor stack 33 with pole teeth 5, which are mounted for example on a rotor shaft 3. The rotor stack 33 and the pole teeth 5 consist of individual conductive laminations in order to reduce the losses. The windings 11 are wound around the pole teeth 5, in the grooves 7 between the pole teeth 5. Above the windings 11, an end portion 31 of the pole tooth 5 protrudes beyond the winding 11, and the pole tooth 5 thus has a mushroom shape.

Figure 1:
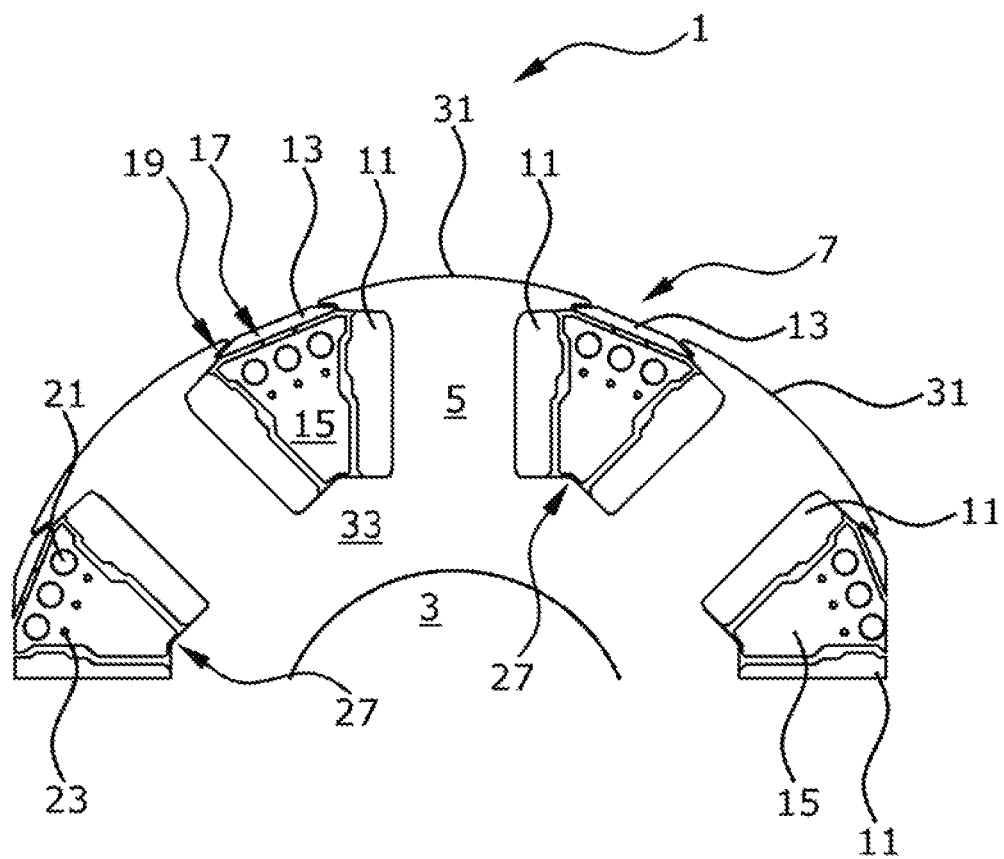
FIG. 1 shows a cross section through a rotor.

At the end portion 31 of the pole tooth 5 there is situated a holding region 19, which holds a groove wedge 13 between two pole teeth 5. The groove wedge 13 covers and thus closes the groove 7, A support element 15 is arranged in each of the grooves 7 and is clamped between the groove wedge 13 and the rotor stack 33 via a clamping point 27.

The teeth 17 on the support elements 15 are compressed by the groove wedge 13 and hold the groove wedge 13 in its position.

The support element 15 has recesses 23, which are used to compensate for an unbalance. On the one hand the recesses 23 may be formed depending on the unbalance, that is to say negative balancing, or they are filled with material depending on the unbalance, what is known as positive balancing.

Further recesses 21 are also provided in the support elements 15 and do not influence the stability, but lead to a saving in weight.

The support element 15 is also adapted to an outer contour of the winding and therefore has an outer recess 25.

Figure 2:
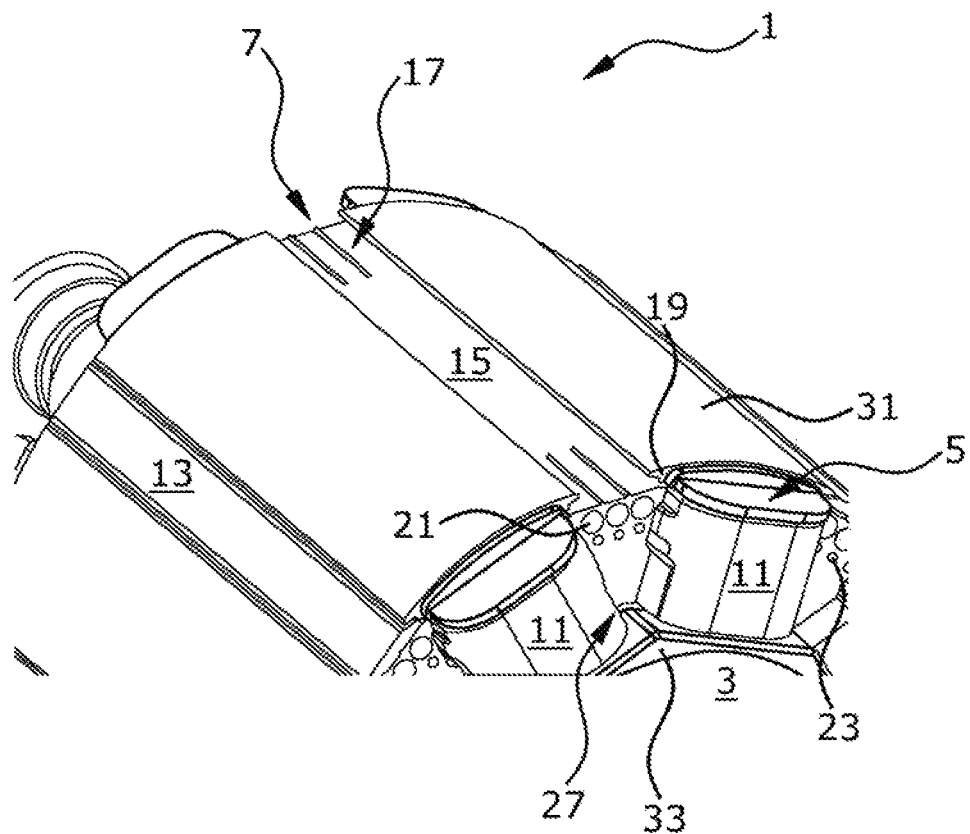
FIG. 2 shows a plan view of a rotor.

In FIG. 2 the support elements 15 in the grooves 7 can be seen. In the case of the support element 15 shown in the middle, the groove wedge 13 is missing and has been omitted for reasons of improved clarity. Due to the absence of the groove wedge 13, the support element 15 can be seen in its entire length. The teeth 17 are situated on the upper side at the start and at the end. Alternatively, the teeth may also run continuously over the surface.

The support element 15 is connected to the rotor stack 33 via the clamping point 27 and imparts an increased strength to the pole teeth 5 with the groove wedge 13. In particular, a tangential deformation of the pole teeth 5 is minimised.

The groove wedge 13 is inserted into the groove 7 axially above the support element 15 and below the end portion 31 and is held by the holding region 19 and supported by the support element 15. During this process, the teeth 17 are pressed and the groove wedge 13 is fixed. The support element 15 is also fixed in the groove 7 by the clamping that occurs at the clamping point 27.

Figure 3:
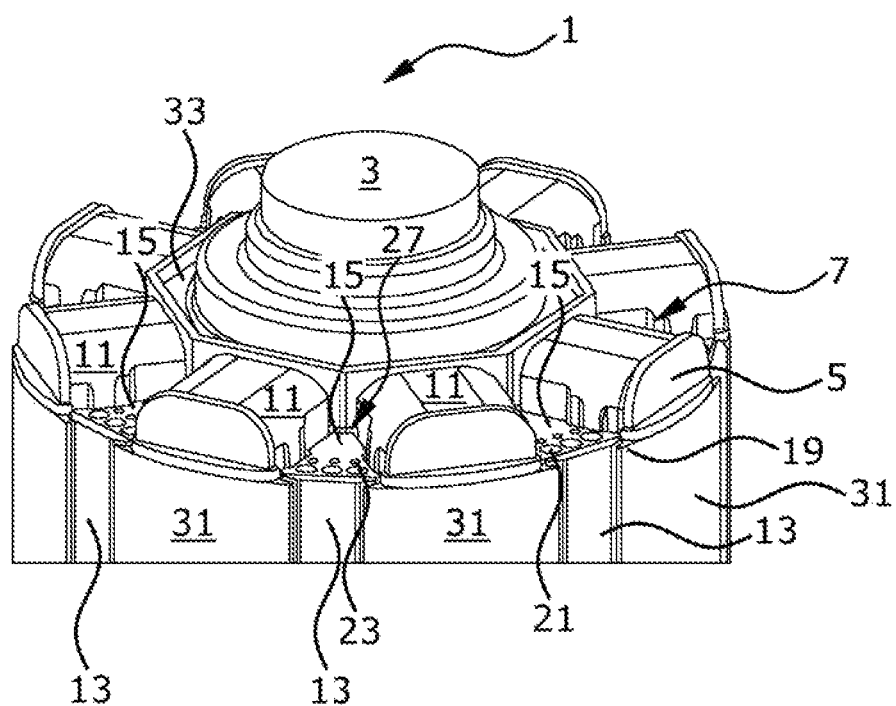
FIG. 3 shows a further plan view of a rotor.

FIG. 3 shows a rotor 1 with eight pole teeth 5 and a support element 15 between each of the pole teeth 5. The groove wedges 13 are situated between the end portions 31 of the pole teeth and are held by the holding regions 19 and supported by the support elements 15.

Figure 4:
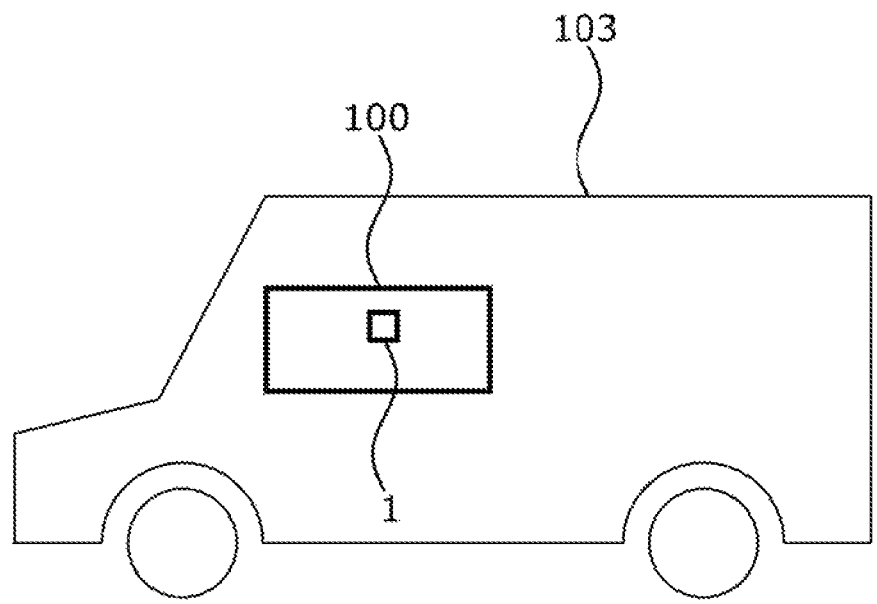
FIG. 4 shows a rotor in an electric motor in a vehicle.

FIG. 4 is a schematic diagram of an exemplary embodiment of a vehicle 103, for example a hybrid vehicle or an electric vehicle, comprising an electrical machine 100, in particular an electric motor, with an exemplary embodiment of the rotor 1 for driving the vehicle 103.

The invention claimed is:

1. A rotor for an electrical machine, comprising:
   a rotor stack with a plurality of pole teeth and windings around the pole teeth,
   a plurality of groove wedges being arranged radially above the windings, in grooves between the pole teeth and
   a support element
      being arranged in the grooves between the windings and radially between the groove wedges and the rotor stack,
      having at least one recess for compensating for an unbalance of the rotor,
      having a clamping point being operatively connected to the rotor stack and
      being clamped between the groove wedge and the rotor stack via the clamping point.

2. The rotor according to claim 1, wherein the support element has at least one tooth extended in a radial direction with respect to the groove wedge, wherein the at least one tooth is operatively connected to the groove wedge.

3. The rotor according to claim 1, wherein the clamping point of the support element is located in a radial direction with respect to the rotor stack.

4. The rotor according to claim 1, wherein the support element has a recess adjacent to the windings.

5. The rotor according to claim 1, wherein the support element has at least one recess in a radial direction in order to save weight.

6. The rotor according to claim 1, wherein the pole tooth has an end portion that protrudes beyond the windings in a circumferential direction with respect to the support element and said end portion has a holding region that is engaged with the groove wedge.

7. The rotor according to claim 1, wherein the support element is shaped to be compressed by the groove wedge to support the groove wedge and hold the groove wedge in position.

8. The rotor according to claim 1, wherein at least one tooth extends over a region of the support element.

9. A vehicle with an electric motor, with a rotor according to claim 1.

10. A vehicle with an electrical machine, with a rotor according to claim 1.

* * * * *